Figure 1:
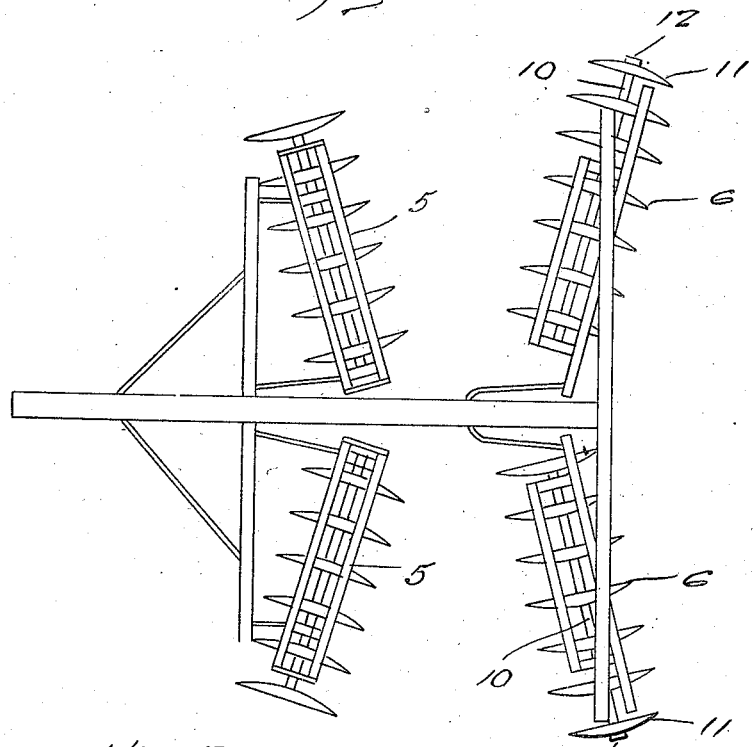

Feb. 8, 1927. 1,616,576
P. W. ISELEY
DISK HARROW
Filed March 24, 1925

Inventor
P. W. Iseley
By
Attorney

Patented Feb. 8, 1927.

1,616,576

UNITED STATES PATENT OFFICE.

PETER W. ISELEY, OF McLEANSVILLE, NORTH CAROLINA.

DISK HARROW.

Application filed March 24, 1925. Serial No. 17,965.

This invention relates to a disk harrow and particularly a disk harrow of the double cut type.

The principal object of the invention is to provide additional disks for the rear gangs of disks, at the outer ends of the shafts thereof, so as to fill up the end furrows and leave the ground level and smooth. With the ordinary disk harrows, the end disks of the rear gang leave a furrow open, since there is no other disks to close the same.

By the provision of my improvement, these end furrows are covered or milled.

A still further very important object of the invention is to provide an improvement of this nature, which is exceedingly simple in construction, inexpensive, to manufacture, strong, durable, efficient, reliable, not liable to readily get out of order, easy to assemble, and well adapted to the purpose for which it is designed.

With the above and numerous other objects in view, as will appear as the description proceeds, the invention resides in certain novel features of construction, and in the combination and arrangement of parts as will be hereinafter more fully described and claimed.

Figure 2:
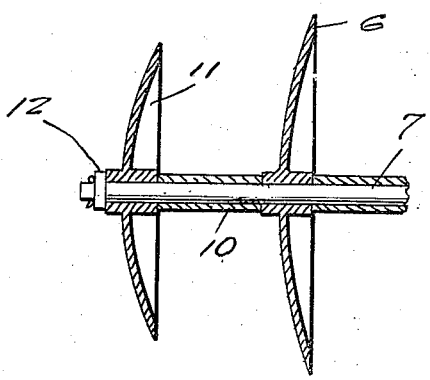
Figure 3:
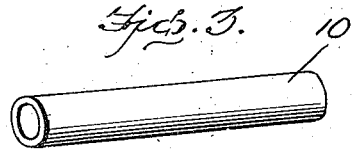

In the drawing:

Figure 1 is a top plan view of a harrow, showing my improvement incorporated therein, Figure 2 is a detail enlarged section through the improvement, and Figure 3 is a perspective view of the spacing sleeve of the improvement.

Referring to the drawing in detail, it will be seen that a harrow has been illustrated, comprising among other elements, the two forward gangs 5 of disks, and the two rear gangs 6 of disks. As is usual, the rear gangs of disks are mounted on shafts 7, but in my improvement are longer than the shaft of the forward gang.

Additional disks 6 and 11 are journaled on shafts 7, the latter being smaller in diameter than the other disks of the gangs 6, so that they will not cut furrows but will reach out and pull down the ridge of the furrow dug by the end disks of the gangs 6, so as to leave the land smooth and level, because these smaller additional disks will fill up the furrow. It will be seen that this improvement may be easily and readily incorporated in practically all disk harrows now on the market. It will be further apparent that the present embodiment of the improvement, which I have described in detail, has been disclosed merely by way of example, and attains all of the features of advantage enumerated as desirable in the statement of the invention and the above description.

Numerous changes in the details of construction, in the sizes, in the proportions, in the materials, and in the combination and arrangement of parts may be resorted to, without departing from the spirit or scope of the invention, as hereinafter claimed or sacrificing any of its advantages.

Having thus described my invention, what I claim as new is:

A leveling disk for double-cut harrows wherein is employed a front and rear gang of cutting disks, a disk of smaller diameter than the cutting disks, a shaft for the rear gang substantially longer than the front gang of cutting disks and adapted to carry the smaller disk in a laterally extended position in respect to the front gang disks, and a sleeve for spacing the smaller disk from the cutting disk at the end of the rear shaft.

In testimony whereof I affix my signature.

PETER W. ISELEY.